Jan. 10, 1956  G. T. GIBSON ET AL  2,730,255
REFUSE-COLLECTING VEHICLE
Filed June 16, 1953
5 Sheets-Sheet 1

Inventors:
GEORGE T. GIBSON
WILLIAM H. W. RAMSAY JR
By Francis E. Boyce
Attorney Jan. 10, 1956 G. T. GIBSON ET AL 2,730,255
REFUSE-COLLECTING VEHICLE
Filed June 16, 1953 5 Sheets-Sheet 2
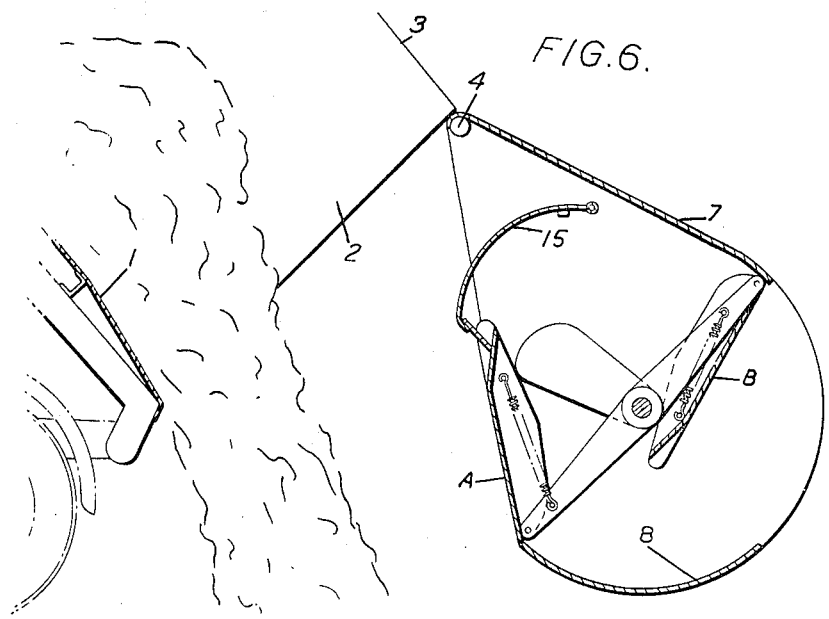
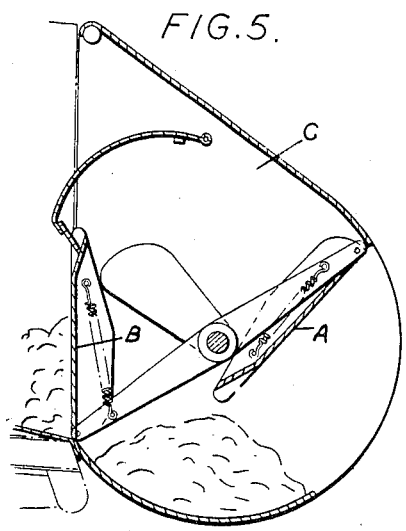
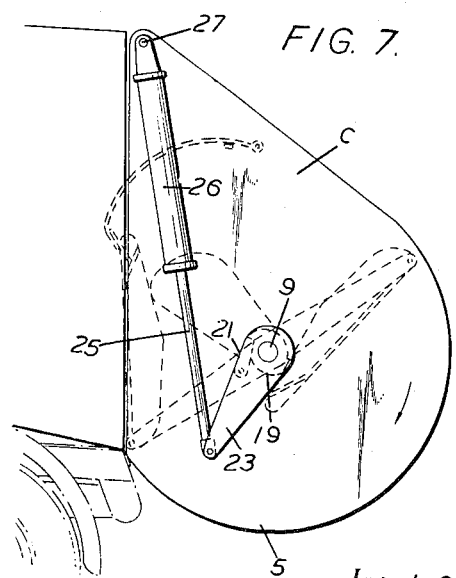
Inventors:
GEORGE T. GIBSON
WILLIAM H. W. RAMSAY Jr
By Francis E Boyce
Attorney

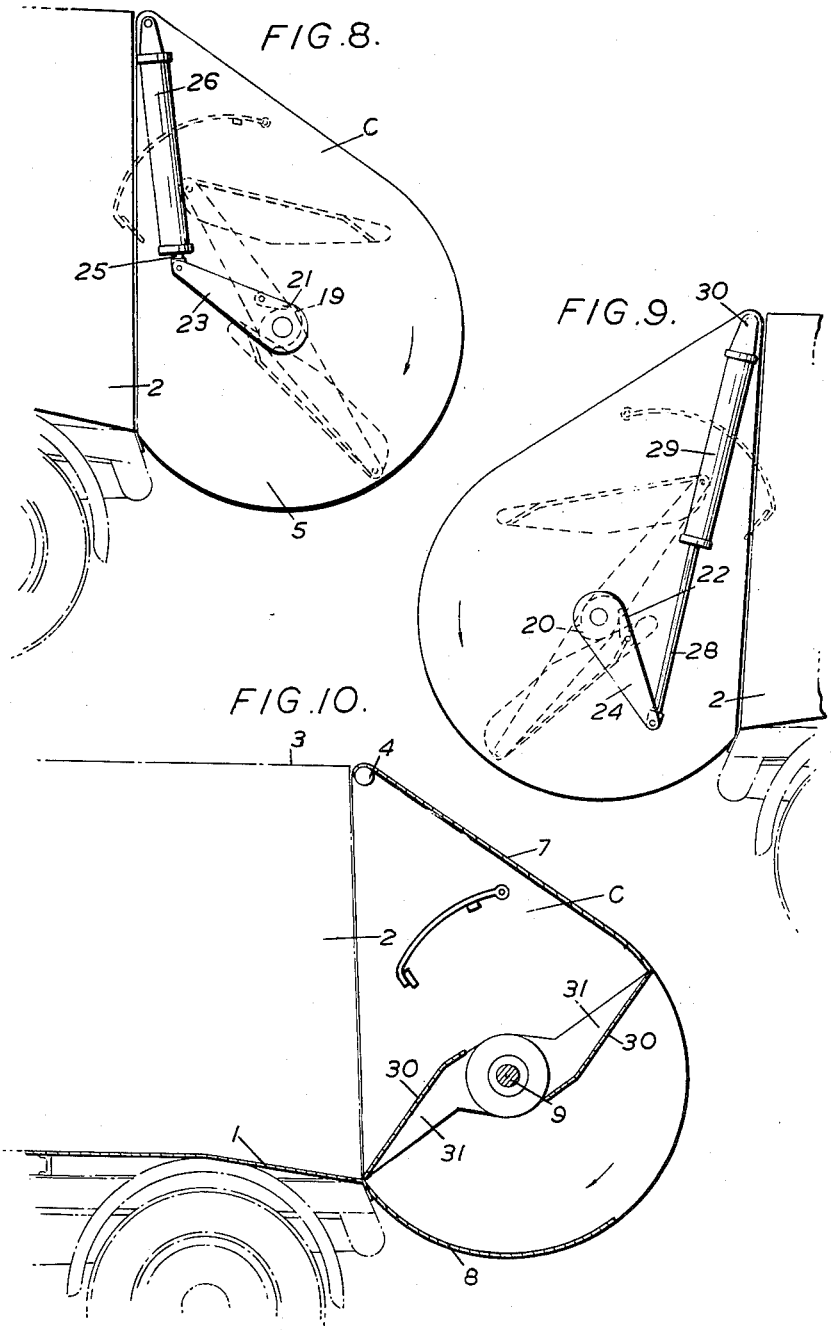

Jan. 10, 1956

G. T. GIBSON ET AL 2,730,255

REFUSE-COLLECTING VEHICLE

Filed June 16, 1953

Inventors:
GEORGE T. GIBSON
WILLIAM H. W. RAMSAY, Jr.
BY: Francis E. Boyce
Attorney Inventors:
GEORGE T. GIBSON
WILLIAM H.W. RAMSAY, JR.
By Francis E Boyce
Attorney United States Patent Office 2,730,255
Patented Jan. 10, 1956

2,730,255
REFUSE-COLLECTING VEHICLE

George Thomson Gibson, Edinburgh, and William Heggie Wilson Ramsay, Jr., Penicuik, Scotland, assignors to John Gibson & Son Limited, Edinburgh, Scotland Application June 16, 1953, Serial No. 362,118

Claims priority, application Great Britain March 17, 1953

9 Claims. (Cl. 214—503)

This invention relates to refuse-collecting vehicles of the kind in which the vehicle floor is provided at its rear end with a transverse curved platform, the front edge of which adjoins the vehicle floor, and in which the platform, when charged with refuse, is emptied by means provided for pushing the refuse off the platform into the vehicle body.

The object of the present invention is to provide a low loading refuse collecting vehicle of the kind above stated with improved means whereby the material is discharged from the platform into the vehicle in an efficient manner.

According to the present invention, a paddle device having a plurality of paddles is provided above the platform, the curvature of which is concentric or nearly concentric with the axis of the paddle device, and power mechanism is provided for turning the paddle device step-by-step in one direction about its axis to cause the paddle device to turn at each step through an angle corresponding to the angular spacing between the paddles so that each paddle in succession discharges material on the platform into the vehicle body, and on the completion of this operation the paddle device is stopped to enable the platform to receive a fresh charge preparatory to the fresh charge being swept off the platform by the next succeeding paddle on re-starting rotation of the paddle device.

The paddle device is preferably provided with two diametrically opposite paddles to provide ample space above the rear edge of the platform for charging the same with refuse when the paddle device is at rest, but there may be three or more equidistantly spaced paddles, provided they are sufficiently spaced apart to permit of charging the platform with refuse.

The angle of the paddles to the direction of rotation of the paddle device is preferably adjustable during rotation of the paddle device by the provision of means for imparting a feathering motion to the paddles to enable them to be presented to the refuse at the most suitable angle for effectively pressing and packing the refuse into the vehicle and for withdrawing the paddle upwards and rearwards from the material within the vehicle so as to reduce to a minimume the amount of refuse which can fall back on to the platform when the paddle is withdrawn by the rotation of the paddle device.

The present invention further consists in the provision of a wiping or brushing element above the paddle device with a wiping or brushing edge adapted to make contact with the forward face of the paddles as they are successively withdrawn from the platform. The wiping or brushing element also serves to prevent the refuse from fouling the paddle device.

The paddle device and the wiping or brushing element may be carried on a tail gate structure adapted to be attached to the rear open end of the vehicle body, said tail gate structure comprising transversely connected side members between which the paddle device is mounted for rotation above the curved platform which may be either attached to the vehicle or to the tail gate structure, a closing member being provided on the tail gate structure for closing the space above said paddle device between said side members, and the power mechanism for operating the paddle device being carried by said side members.

The said tail gate structure may be hingedly suspended from the rear of the vehicle body so that it can be swung outwards either by gravity or by the provision of power mechanism. For example, the tail gate structure may be hinged to the upper rear edge of a vehicle in which the body is tipped rearwards for emptying and in which the tail gate structure swings outwards by gravity or by the actuation of power mechanism when the vehicle body is tipped rearwards.

The paddle device may be rotated stepwise by any convenient intermittent power driving mechanism, but it is preferred to drive the paddle device by means of fluid-pressure operated rams operating on the paddle device through ratchet gearing. For example, where there are two diametrically opposite paddles, opposite ends of the central shaft of the paddle device may carry toothed ratchet discs set at 90° to each other and driven alternately by rams, one at each side of a tail gate on which the paddle device is rotatably mounted, said rams being alternately actuated by fluid pressure controlled by a distributing valve which can be actuated by lever or like mechanism under the control of an attendant, so that the attendant can start up the paddle device after each charging operation, while the ratchet driving gear provides for automatic stoppage of the paddle device on the completion of each 180° of travel.

The paddles may be either flat plates or shaped to give the most effective form for the transfer and packing of the material into the vehicle, and the wiping or brushing element may be likewise either a flat plate or shaped for effectively preventing the material within the vehicle from escaping therefrom.

The invention will be more readily understood by reference to the accompanying explanatory diagrammatic drawings illustrating embodiments of the invention.

Figs. 1 to 6 are vertical sectional views through the tail gate structure and rear end of the vehicle body showing the paddle device in various stages of its movement.

Figs. 7 and 8 are side views showing one of the paddle operating rams in extended and retracted position respectively.

Fig. 9 is a view of the other side of the tail gate structure showing the paddle operating ram at that side of the vehicle.

Fig. 10 illustrates in vertical section an alternative form of paddle device on the tail gate structure.

Figure 1:
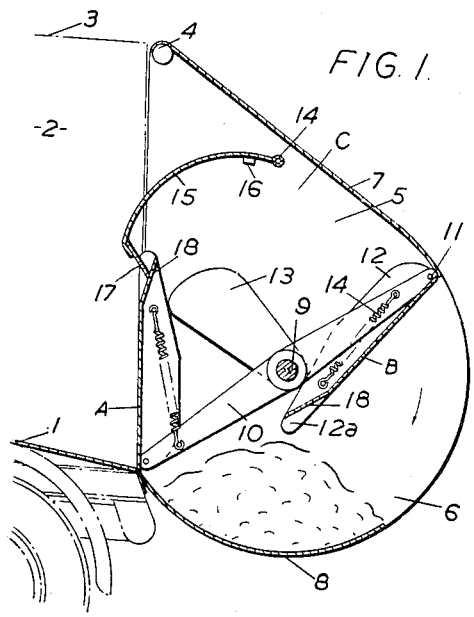

Referring firstly to Figs. 1 to 6, there is illustrated a vehicle body having a floor 1, sides 2 and roof 3. A tail gate structure indicated by the general reference character C is hinged at its upper end at 4 to the rear end of the vehicle roof and comprises side members 5 which are triangular in their upper part and have a lower semicircular part. The side members 5 are connected at their inclined rear edges by a closing plate 7 leaving an open part 6 at the rear. The lower edges of the side parts 5 extend down to a curved platform 8 which, in the example illustrated, is secured to the side members 5, but the platform 8 may form an extension of the vehicle floor 1 and be secured to the vehicle. A shaft 9 extends transversely through the tail gate structure, being supported at its ends in suitable bearings in the side members 5.

A paddle device is mounted on the shaft 9 and comprises arms 10, the outer ends of which pivotally support two paddles A and B on pivots 11. Secured to the paddles A and B adjacent the side members 5 are plates 12 having their edges shaped to engage cams 13 fixed one to each side member 5, the plates 12 being held in engagement with the cams 13 by springs 14 connecting the plates 12 to the arms 10. The plates 12 thus act as followers, following the shape of the cams 13 and controlling the angular position of the paddles during their rotation with the shaft 9, which is adapted to be rotated in the direction of the arrow. Pivoted at 14 above the paddle device between the side members 5 is a wiping or brushing element 15 which normally rests on stops 16 and carries a wiper or brush 17. For reasons which will be hereinafter explained, the paddles A and B are bent inwards at their free edges 18 and the follower plates 12 extend beyond the free edges and have rounded ends 12a.

The shaft 9 may be rotated step-by-step by any convenient mechanism. In Figs. 7 to 9 the opposite ends of the shaft 9 have ratchet discs 19 and 20 secured thereon for engagement with pivoted pawls 21 and 22 on arms 23 and 24 rotatable on the shaft 9. The arm 23 is articulated to the ram 25 of a hydraulic or other fluid pressure cylinder 26 pivoted at 27 to the adjacent side member 5. At the other side of the tail gate structure the arm 24 is attached to the ram 28 of a fluid pressure cylinder 29 pivoted at 30 to the side member 5 at that side of the structure. The ratchet discs 19 and 20 are set at 90 degrees to each other. The pressure fluid supply to the cylinders 26 and 29 is under the control of an attendant so that when pressure fluid is supplied to one cylinder it is exhausted from the other.

The mechanism operates as follows:

In the position of the parts shown in Figs. 1 and 7, the paddle A is pressed by the fixed cam 13 into a substantially vertical position in which it closes the lower rear end of the vehicle, and the paddle B is drawn back by the spring 14 into a position enabling refuse to be introduced into the opening between the rear edge of the platform 8 and the paddle B. When the desired amount of refuse has been fed to the platform, the attendant actuates a lever (not shown) to supply pressure fluid to one of the cylinders 26 or 29. One ram is thus moved outwards and the other ram moves inwards, turning the shaft 9 and the paddles through 90 degrees during which the paddles move through the position shown in Fig. 2 to the position shown in Fig. 3. During this movement, material may fall back from the vehicle on to the platform, to be subsequently swept forward with the material on the platform.

Figure 2:
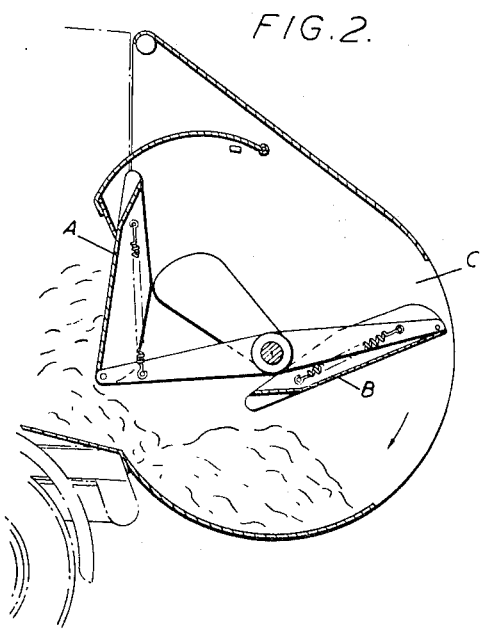

As clearly seen in Fig. 2, the wiper or brush 17 cleans the face of the paddle A as the latter rises, until the paddle A clears the wiper or brush.

Figure 3:
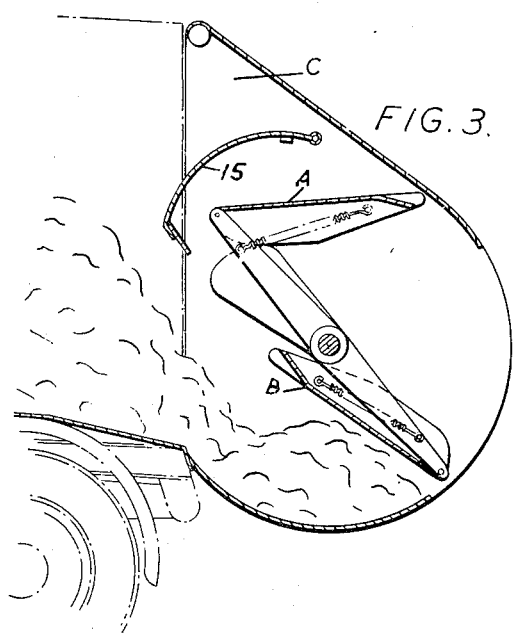
Figure 4:
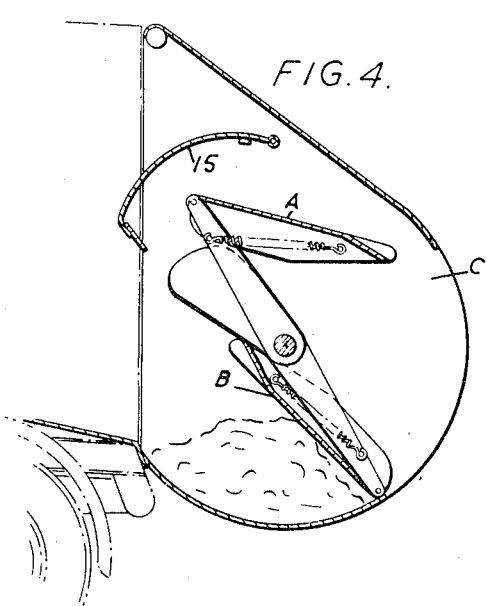

When the parts reach the position shown in Fig. 3, the rams 25 and 28 are in the positions seen in Figs. 8 and 9, whereupon a distributing valve (not shown) delivers the pressure fluid supply from one cylinder to the other and rotation of the shaft continues through a further 90 degrees, moving the paddles through the position shown in Fig. 4 into the position shown in Fig. 5. The distributing valve then cuts off the pressure fluid supply and the shaft 9 ceases to rotate.

In the position shown in Fig. 4, the paddle B has reached the platform and commences to sweep the material off the platform into the vehicle until the paddle B reaches the position seen in Fig. 5, whereupon the platform can be filled with refuse behind the paddle B. The attendant then operates the pressure fluid control to repeat the cycle of operations and the paddle shaft 9 turns through another 180 degrees until the paddles A and B return to the positions shown in Fig. 1, and the paddle A has swept the material from the platform into the vehicle.

The bent forward edges 18 of the baffles assist the passage of the baffles behind the wiper or brush 17, and the rounded ends 12a of the follower plates 12 guide the baffles around the low part of the cam 13 as the baffles pass from the position of the baffle A in Fig. 4 to its position seen in Fig. 5, into which position it is assisted by the spring 14.

The vehicle may be emptied in any convenient manner. For example, it may be of the type having a dumping floor through which the material is discharged when the vehicle is full, in which case the side members 5 of the tail gate structure may be fixed to or form extensions of the vehicle sides 2.

Alternatively, and as shown in Fig. 6, the vehicle body may be of the rearwardly tipping type for emptying, in which case the tail gate structure may be swung out to the position shown in Fig. 6 by the provision of power mechanism for oscillating the tail gate structure about its suspension hinge 4.

Fig. 10 illustrates a simplified form of paddle device which may be employed where a feathering motion is not desired. In the form shown in Fig. 10 a pair of fixed paddles 30 is carried on arms 31 fixed to a paddle shaft 9 rotated step-by-step in the manner already described. A scraper or brushing element 15 is employed, in a manner similar to that already described with reference to Figs. 1 to 9.

Figure 11:
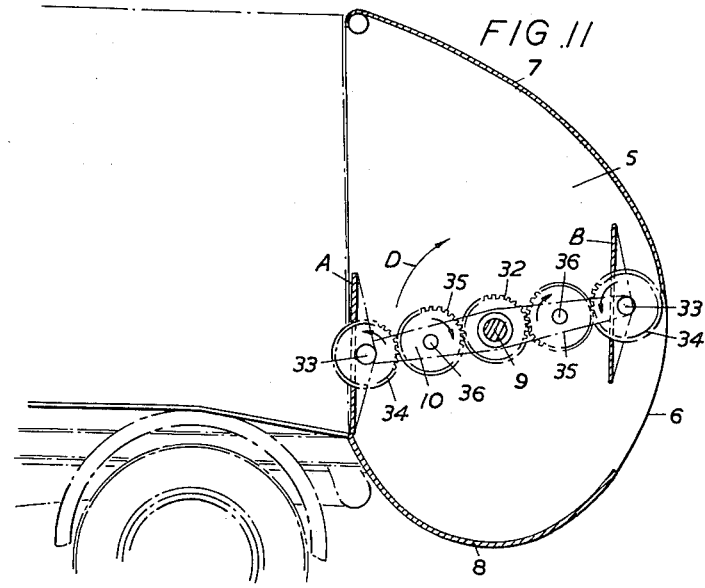
Figs. 11 and 12 are vertical sectional views of an alternative drive for the paddle device employing a train of gear wheels, Fig. 11 showing the paddle device in the position assumed ready for receiving material on the curved platform, and Fig. 12 showing the paddle device in the operation of sweeping material from the curved platform into the vehicle body.
Figure 12:
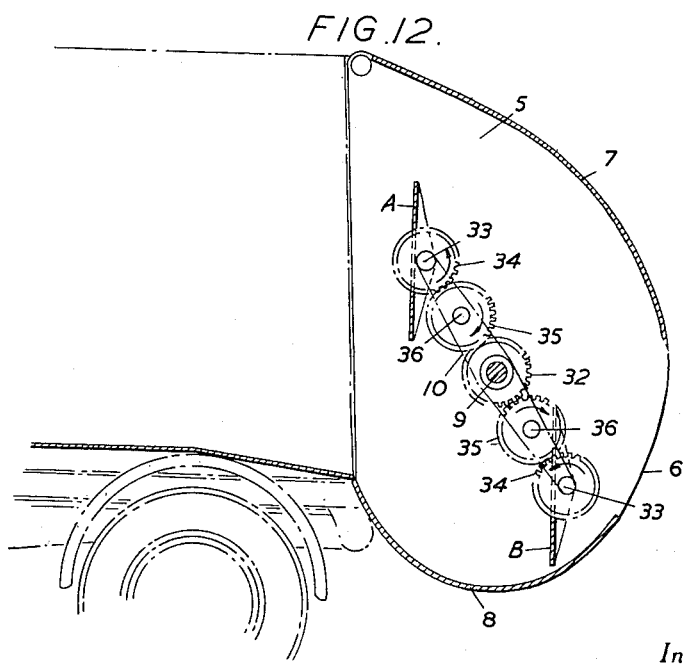

Figs. 11 and 12 illustrate a modified arrangement for driving the paddles by means of a train of gear wheels. In this construction the paddle shaft 9 rotatably mounted at its ends in bearings in the side walls 5 of the tail gate structure has gear wheels 32 loosely mounted thereon, one at each end of the shaft 9, the gear wheels 32 being fixed against rotation, as by securing them to the side walls 5. Double arms 10 are fixed on the ends of the shaft 9 for rotation therewith and each arm 10 carries at its ends paddles A and B fixed on trunnions 33 which are rotatably mounted in the ends of the arms 10. Fixed on the trunnions 33 are gear wheels 34 which are geared to the central gear wheel 32 by intermediate gear wheels 35, which are rotatably mounted on stub axles 36 carried by the arms 10. Only one arm 10 and its train of gear wheels is shown in Figs. 11 and 12. A similar arm 10 and train of gear wheels is fitted to the other end of the shaft 9.

When the shaft 9 is turned through 180 degrees in the direction of the arrow D, the arm 10 turns therewith and the intermediate gear wheels 35 roll around the fixed gear wheel 32 and as the gear wheels are all of the same diameter and have the same number of teeth, the gear wheels 34 which turn with the paddles A and B in an anticlockwise direction and make one half revolution for each half revolution of the shaft 9 and arm 10. The paddles A and B have their paddle faces vertically or nearly vertically disposed and consequently remain in a constant upright position as the shaft 9 and arm 10 are turned clockwise by any suitable mechanism, such as that already described with reference to Figs. 6 to 9 or hereinafter described with reference to Figs. 14 and 15.

Fig. 11 shows the paddle device in the position of rest when the paddle A has swept material from the curved platform 8 into the vehicle body, in which position the paddle B is held suspended above the rear edge of the platform 8 to permit the platform 8 to be charged with material through the opening 6 at the rear of the tail gate structure between the rear edge of the platform 8 and the lower edge of the closing plate 7 of the tail gate structure. Fig. 12 shows the paddle device at a point in its travel in which the paddle B has commenced to sweep material in front of it, until finally the paddle B reaches the position formerly assumed by the paddle A shown in Fig. 11, whereupon the paddle device comes to rest. The platform 8 is then again filled with material through the opening 6 and the paddle device again turned through 180 degrees to repeat the cycle of operation.

It will be apparent that there might be three or more paddles equi-angularly spaced apart and each driven by a train of gear wheels in a similar manner to the paddles A and B, in which case the paddle shaft will be rotated intermittently through an angle equal to the spacing of the paddles in order to bring each paddle in succession into the position corresponding to the position of the paddle A in Fig. 11.

Figure 13:
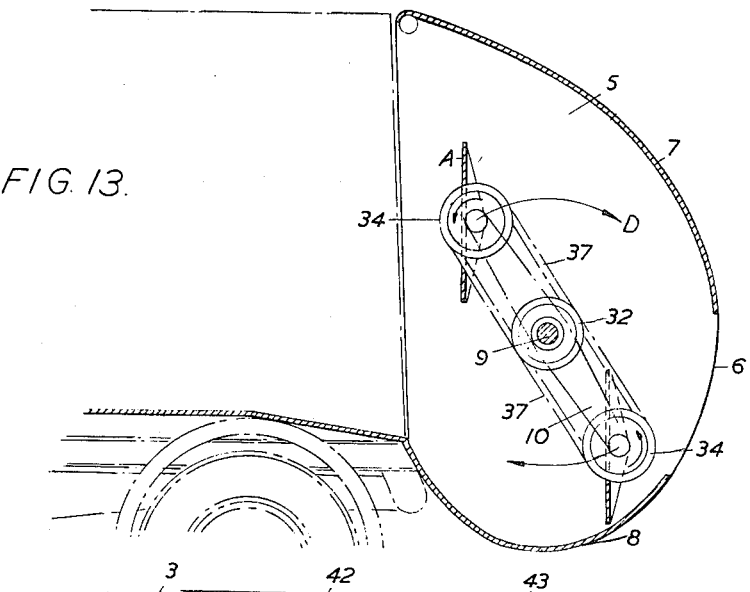
Fig. 13 is a view similar to Fig. 12 showing the substitution of chain gearing for the train of gear wheels.

Fig. 13 illustrates a modification in which the train of gear wheels shown in Figs. 11 and 12 is replaced by chain gearing. In this case the intermediate gear wheels are omitted and the gear wheels 32 and 34 are in the form of chain sprocket wheels around which passes an endless chain 37, or there may be two fixed chain wheels 32 side by side and two endless chains, one connecting one of the chain wheels 32 to the chain wheel 34 of the paddle A and the other connecting the other chain wheel 32 to the chain wheel 34 of the paddle B.

Figure 14:
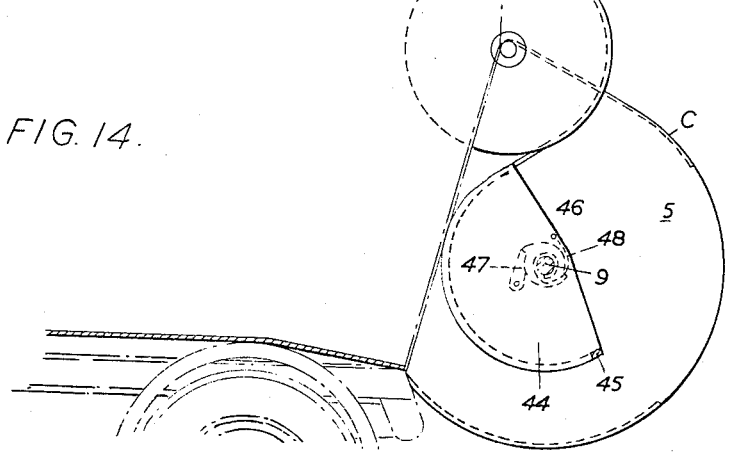
Fig. 14 is a side view of the rear portion of a refuse vehicle fitted with a tail gate structure according to the invention, but showing rope gearing for intermittently rotating the paddle shaft.
Figure 15:
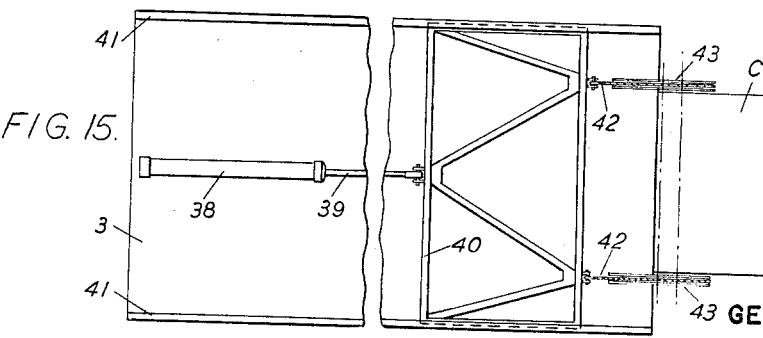
Fig. 15 is a plan view of a vehicle body and tail gate structure showing the operating mechanism for the rope gearing illustrated in Fig. 14.

Figs. 14 and 15 illustrate a simplified form of mechanism for intermittently rotating the paddle shaft through successive half revolutions. Mounted on the roof 3 of the vehicle body is a double-acting ram cylinder 38, the ram rod 39 of wihch is coupled to a horizontal frame 40 slidable at its side edges in channels or guides 41 on the roof 3. The ram cylinder 38 is supplied with pressure fluid through pipes leading to opposite ends of the cylinder and the pressure fluid supply is controlled by a valve in a manner well known to enable the ram rod 39 to be extended or retracted, thus moving the frame 40 either rearwards towards the tail gate structure C or forwards away therefrom. A pair of ropes 42 connected to the frame 40 passes over pulleys 43 above the tail gate structure to and around pulleys 44, which may be in the form of grooved segments as shown in Fig. 14. The ropes 42 are secured to the pulleys 44 at 45, and the pulleys 44 are rotatably mounted on the ends of the paddle shaft 9 outside the side walls 5 of the tail gate structure. A ratchet disc 46 on each end of the paddle shaft 9 has a pair of diametrically opposite teeth coacting with a pawl 47 on the pulley 44 and constitutes a one-way drive clutch between the pulley 44 and shaft 9. A helical or coil spring 48 encircling the paddle shaft 9 and connected at one end to one of the side walls 5 and at the other end to the pulley 44 urges the pulley 44 to turn in a direction to exert a pull on the ropes.

Fig. 15 shows the ram rod 39 at the end of its outstroke, when the pulley 44 takes up the position shown in Fig. 14, and the paddle shaft 9 is at rest. On the admission of pressure fluid to the rear end of the ram cylinder 38, the frame 40 is moved forwards by the inward movement of the ram rod 39, and the ropes 42 turn the pulleys 44 through a half revolution in a clockwise direction as seen in Fig. 14. This causes the pawl 47 to rotate the cam 46 and paddle shaft 9 through 180 degrees. When the ram rod 39 reaches the end of its inward movement, the pressure fluid supply to the rear end of the ram cylinder 38 is cut off and pressure fluid supplied to the other end of the ram cylinder. This drives the ram rod 39 on its outstroke, returning the frame 40 to the position seen in Fig. 15, and at the same time the spring 48 returns the pulley 44 to its initial position shown in Fig. 14, taking up any slack in the ropes 42, while the paddle shaft 9 remains at rest, thus permitting material to be tipped on to the curved platform 8 of the tail gate structure in readiness for the next operation of the ram rod, when inward movement thereof will rotate the paddle shaft 9 through another 180 degrees and the material will be swept off the platform 8 by the paddle device into the vehicle body.

We claim:

1. A tail-gate structure for suspension at the rear open end of a vehicle body comprising a pair of vertical side wall members of segmental shape spaced apart, an arcuate platform connecting the lower edges of said members, a paddle device rotatably mounted upon a transverse axle between said members, said paddle device having a pair of diametrically opposite arms, and paddles pivotally attached to the outer ends of said arms, a rear wall connecting the rear edges of said members above the paddle device, a fixed cam on each of said members, cam plates fixed to said paddles and arranged to coact with said cams, spring means for urging said paddles to turn about their pivotal attachments to said arms to hold said cam plates in contact with said cams, and means for imparting intermittent rotary motion through 180 degrees to said paddle device to impart in conjunction with the shape of said cam a feathering rotary motion to said paddles so that, when the paddle device is at rest, one of said paddles is disposed substantially vertically above the front edge of said platform and the other paddle is disposed inwards of the lower edge of said rear wall to permit the introduction of material on to said platform from the rear thereof, subsequent movement of said paddle device through 180 degrees causing the inwardly disposed paddle to sweep over said platform into a substantially vertical position at the front edge thereof and causing the other paddle to move upwards and rearwards into a position disposed inwards of the lower edge of said rear wall.

2. In a refuse vehicle, a vehicle body open at the rear thereof, a tail gate structure hinged to said body over the open rear thereof, and incorporating a material-receiving platform, a paddle shaft mounted on said structure above said platform, paddle supporting members secured to and extending outwards from said shaft, paddles rotatably supported at the outer ends of said members, mechanism for maintaining said paddles in a substantially constant upright position during planetary motion about the axis of the paddle shaft, means for holding said paddle shaft against rotation between successive operations of charging said platform with material when one paddle is positioned to close off the rear of the vehicle body from the platform and the next succeeding paddle gives unobstructed access to the rear of the platform, and mechanism for turning said shaft to effect the planetary motion of said paddles until the last-mentioned paddle assumes the position formerly occupied by the first-mentioned paddle.

3. A refuse vehicle as specified in claim 2 wherein each paddle is fixed to a planetary gear wheel forming one wheel of a train of gear wheels meshing with a fixed central gear wheel on the paddle shaft axis and such that the paddles remain always in a vertical position.

4. A tail gate structure for a refuse vehicle comprising transversely connected side walls, a material-receiving platform extending between said side walls, a paddle shaft extending between and rotatably mounted at its ends in said side walls above said platform, arms secured to and extending outwards from the ends of said shaft, a fixed central gear wheel secured to each of said side walls coaxial with the axis of said shaft, paddles rotatably mounted between the outer ends of said arms, outer gear wheels coaxially mounted with respect to and fixed to said paddles, intermediate gear wheels meshing with said fixed central gear wheel and said outer gear wheels, all said gear wheels being of equal diameter and having the same number of teeth so that said paddles always remain in a vertical position, means for holding said paddle shaft against rotation between successive operations of charging said platform with material when one paddle is positioned to close off the rear of the vehicle body from the platform and the next succeeding paddle gives unobstructed access to the rear of the platform, and mechanism for turning said shaft to effect the planetary motion of said paddles until the last-mentioned paddle assumes the position formerly occupied by the first-mentioned paddle.

5. A refuse vehicle tail gate structure comprising transversely connected side walls, a material-receiving platform extending between said side walls, a paddle shaft extending between and rotatably mounted at its ends in said side walls above said platform, arms secured to and extending outwards from the ends of said shaft, a fixed central chain wheel secured to each of said side walls coaxial with the axis of said shaft, paddles rotatably mounted between the outer ends of said arms, outer chain wheels coaxially mounted with respect to and fixed to said paddles, endless chains driving said outer chain wheels from said fixed central chain wheel so that said paddles always remain in a vertical position, means for holding said paddle shaft against rotation between successive operations of charging said platform with material when one paddle is positioned to close off the rear of the vehicle body from the platform and the next succeeding paddle gives unobstructed access to the rear of the platform, and mechanism for turning said shaft to effect the planetary motion of said paddles until the last-mentioned paddle assumes the position formerly occupied by the first-mentioned paddle.

6. In a refuse vehicle having a vehicle body open at the rear end thereof, a tail gate structure hinged to said vehicle body over the open rear end thereof and incorporating a material-receiving platform, a paddle shaft rotatably mounted on said structure above said platform, a paddle device fixed on said shaft, and means for intermittently rotating said shaft through successive half revolutions comprising rope pulleys rotatable one on each end of said shaft, a one-way drive clutch between each of said pulleys and said shaft, guide pulleys mounted above said rope pulleys, a frame reciprocable in guides on the roof of said vehicle body, ropes secured at one end to said frame and passing around said guide pulleys and rope pulleys and secured at their other ends to said rope pulleys where they are lapped around the latter, and a ram cylinder having a ram rod reciprocable therein and connected at its outer end to said frame.

7. A refuse-collecting vehicle comprising a vehicle body, a transverse curved platform at the rear of the vehicle body floor, a rotary paddle device above said platform and having its axis in or substantially in the centre of curvature of said platform, said paddle device incorporating a plurality of paddles spaced from each other at an angular spacing substantially greater than the angle subtended by said platform, means for holding said paddle device stationary between successive operations of charging said platform with material, when one paddle is positioned to close off the rear of the vehicle body from the front edge of said platform and the next succeeding paddle is at such a distance from the rear edge of said platform as to leave the latter free to receive a charge of material, and mechanism for turning said paddle device through an angle corresponding to the angular spacing between the paddles to sweep the material off said platform into the vehicle body and to advance the paddles into a position in which the rear end of the vehicle body is again closed off and the platform is free to receive a fresh charge.

8. A refuse-collecting vehicle according to claim 7 including means for imparting motion to the paddles during turning movement of the paddle device to present each paddle successively in a substantially vertical position at the front edge of the platform.

9. A tail-gate structure for the rear end of a vehicle body comprising transversely connected side frame members, means adapted for pivotally attaching said members to the rear upper end of the vehicle body, a paddle device mounted for rotation between said members, closing means closing the space between said members above said paddle device, angularly spaced paddles carried by said paddle device, power mechanism carried by said side members and operative to effect rotation of said paddle device through an angle corresponding to the angular spacing between said paddles to move each paddle in succession into a position of rest in front of a material-receiving platform, and means for imparting a secondary motion to said paddles during rotation of said paddle device to cause said paddles to be successively presented to the platform and move thereover at such an angle as effectively to sweep material from said platform and subsequently to cause the paddle to assume an upright position in which it closes off the rear of the vehicle body and to maintain such upright position while it is being withdrawn upwards away from said platform during the next rotary movement of said paddle device.

References Cited in the file of this patent
UNITED STATES PATENTS

| Number | Name | Date |
|---|---|---|
| 281,570 | Severance | July 17, 1883 |
| 2,496,192 | Baldt | Jan. 31, 1950 |
| 2,571,084 | Yarmak | Oct. 9, 1951 |
| 2,573,270 | Miller | Oct. 30, 1951 |
| 2,627,761 | Recker | Feb. 10, 1953 |
| 2,644,594 | Komuchar et al. | July 7, 1953 |
| 2,660,326 | Calamore | Nov. 24, 1953 |